(12) United States Patent
Pasupuleti et al.

(10) Patent No.: US 9,703,693 B1
(45) Date of Patent: Jul. 11, 2017

(54) REGRESSION TESTING SYSTEM FOR SOFTWARE APPLICATIONS

(71) Applicant: FMR LLC, Boston, MA (US)

(72) Inventors: Pratap Pasupuleti, West Windsor, NJ (US); Alexander Melamed, Brooklyn, NY (US); Duilio Gamba, Brooklyn, NY (US); Thomas Trogele, Hingham, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 15/453,826

(22) Filed: Mar. 8, 2017

(51) Int. Cl.
   *G06F 11/36* (2006.01)
(52) U.S. Cl.
   CPC ...... *G06F 11/3688* (2013.01); *G06F 11/3692* (2013.01)
(58) Field of Classification Search
   None
   See application file for complete search history.

(56) References Cited

U.S. PATENT DOCUMENTS

| | | | |
|---|---|---|---|
| 6,427,000 B1 | 7/2002 | Mumford et al. | |
| 6,981,180 B1 | 12/2005 | Bailey et al. | |
| 8,386,852 B2 * | 2/2013 | Cohen | G06F 11/3688 714/33 |
| 8,683,264 B2 | 3/2014 | Bacher et al. | |
| 8,881,105 B2 * | 11/2014 | Quilter, Jr. | G06F 11/3672 714/38.1 |
| 8,924,934 B2 * | 12/2014 | Sullivan | G06F 11/3664 715/716 |
| 2005/0050521 A1 * | 3/2005 | Chang | G06F 11/3688 717/124 |
| 2006/0031718 A1 * | 2/2006 | Thornhill | G06F 11/3672 714/38.1 |
| 2007/0162894 A1 * | 7/2007 | Noller | G06F 11/3688 717/124 |
| 2008/0109790 A1 * | 5/2008 | Farnham | G06F 11/3688 717/128 |
| 2008/0282230 A1 * | 11/2008 | Belvin | G06F 11/3692 717/125 |

(Continued)

*Primary Examiner* — Chat Do
*Assistant Examiner* — Douglas Slachta
(74) *Attorney, Agent, or Firm* — Proskauer Rose LLP (57) ABSTRACT

Methods and apparatuses are described for testing a modified version of a software application. A recorder module stores production incoming messages received by the software application and associated timing data; production outgoing messages sent by the software application and associated timing data; a sequence of random number values and associated timing data; and a plurality of production event registrations by the software application and associated dispatch timing data based on an actual dispatch time associated with the production event registration. A playback module sends production incoming messages to the modified software application; receives and validates test outgoing messages from the modified software application; sends the sequence of random number values to the modified software application; receives and validates test event registrations from the modified software application; and sends to the modified software application a dispatch message to dispatch an event associated with a test event registration.

21 Claims, 5 Drawing Sheets

(56) References Cited

U.S. PATENT DOCUMENTS

| | | | |
|---|---|---|---|
| 2009/0150867 A1* | 6/2009 | Vorungati | G06F 11/3688 717/124 |
| 2011/0131450 A1 | 6/2011 | Wheeler et al. | |
| 2013/0152048 A1* | 6/2013 | Sato | G06F 11/2236 717/124 |
| 2014/0101640 A1* | 4/2014 | Romdhane | G06F 11/3684 717/125 |
| 2015/0058826 A1* | 2/2015 | Hu | G06F 11/362 717/128 |
| 2015/0169432 A1* | 6/2015 | Sinyagin | G06F 11/3684 717/124 |

\* cited by examiner

305 1:INPUT:RAND:NOW:RAND Val=0.059996]
310 2:INPUT:C1:NOW:[MESSAGE DATA]
315 3:VALIDATE:C3:WAIT:[MESSAGE DATA]
320 4:VALIDATE:INTERNAL:WAIT:TIMEREVENT Time=35]
325 5:INPUT:C4:AT-12.03.29-004550:[MESSAGE DATA]
330 6:INPUT:INTERNAL:AT-12.03.29-004559:TIMEOUT RefOrder=4]
335 7:VALIDATE:C4:WAIT:[MESSAGE DATA]

REGRESSION TESTING SYSTEM FOR SOFTWARE APPLICATIONS

TECHNICAL FIELD

The technology relates generally to systems, methods, and apparatuses for regression testing software applications and, more specifically, to systems, methods, and apparatuses for testing timing-dependent software applications.

BACKGROUND

Development of software applications typically involves an ongoing process of modifying the applications to add new functionality or features. As the applications are modified, an important goal of testing the modified applications is ensuring that existing features of the applications continue to perform as expected after modification. The process of testing applications to determine if the performance of existing features have changed, or regressed, is typically referred to as regression testing.

Regression testing for an application typically involves running test cases on the application before modification to determine its expected performance. Following modification, the same test cases can then be run on the application to determine if the application's performance has changed. Such regression testing requires recreating the same operating conditions for the application when the tests are run before and after modification. As applications become increasingly complex, the difficulty of recreating operating conditions for regression testing increases. For example, an application can interact with external software components (e.g., components not controlled by the application being tested) by sending data to or receiving data from the external software components. Recreating an operating environment in which these external software components behave the same and interact with the software application in the same way, with the same timing, across test case runs can create challenges for regression testing.

Conventional approaches to regression testing, whether automated or manual, often involve capturing the sequence of data sent by the external software components to the application when running test cases before modification. In these approaches, the same data is then provided to the application when running test cases after modification. However, these approaches do not account for all of the timing aspects necessary to ensure that the operating environment is the same for the application during pre-modification testing and post-modification testing.

SUMMARY

Accordingly, there is a need for systems, methods, and apparatuses for testing timing-dependent software applications that can recreate the operating environment for the application during test case runs. The technology described herein can facilitate recreating the operating environment for the application during test case execution by preserving and reproducing the timing of the events that occur during the execution of the application, including by overriding the application's internal clock.

In one aspect, there is a computer system for testing a modified version of a software application. The computer system includes a random number generator. The computer system includes a system clock. The computer system includes a recorder module, during a production execution of the software application, the recorder module configured to: store a plurality of production incoming messages received by the software application from a first plurality of external software components, and for each production incoming message of the plurality of production incoming messages, store associated timing data; and store a plurality of production outgoing messages sent by the software application to a second plurality of external software components, and for each production outgoing message of the plurality of production outgoing messages, store associated timing data; store a sequence of random number values received by the software application from the random number generator, and for each random number value store associated timing data; store a plurality of production event registrations by the software application, and for each production event registration of the plurality of production event registrations, store associated dispatch timing data, the dispatch timing data based on an actual dispatch time from the system clock for a production event associated with the production event registration. The computer system includes a playback module, during a test execution of the modified software application, the playback module configured to: connect, to the modified software application, via a communication channel; send, to the modified software application, via the communication channel, one or more production incoming messages of the plurality of production incoming messages and the associated timing data, wherein for each production incoming message of the one or more production incoming messages the sending is based on at least one of a request received from the software application and the associated timing data of the production incoming message, the production incoming message causing the software application to adjust an internal time based on the associated timing data of the production incoming message; receive, from the modified software application, via the communication channel, one or more test outgoing messages and validate the one or more test outgoing messages based on the plurality of production outgoing messages; send, to the software application, via the communication channel, one or more random number values of the sequence of random number values, wherein for each random number value of the one or more random number values the sending is based on the associated timing data for the random number value; receive, from the software application, via the communication channel, one or more test event registrations and validate the one or more test event registrations based on the plurality of production event registrations; and send, to the software application, via the communication channel, a dispatch message to dispatch an event associated with a test event registration of the one or more test event registrations, the dispatch message causing the software application to dispatch the event based on the associated dispatch timing data of a production event registration corresponding to the test event registration.

In some embodiments, at least one external software component is in the first plurality of external software components and the second plurality of external software components. In some embodiments, at least one external software component of the first plurality of external software components executes on the computer system. In some embodiments, at least one external software component of the first plurality of external software components executes on a second computer system different than the computer system. In some embodiments, the first plurality of external software components include one or more of applications, streaming data sources, and signal sources. In some embodiments, the plurality of production incoming messages include one or more of data values, streaming data, or notifications. In some embodiments, the playback module is further configured to determine the modified software application failed the testing if validation of the one or more test outgoing messages or validation of the one or more test event registrations fails.

In another aspect, there is a computer program product, tangibly embodied in a non-transitory computer readable storage device, for testing a modified version of a software application. The computer program product includes instructions operable to cause a computing system during a production execution of the software application to: store a plurality of production incoming messages received by the software application from a first plurality of external software components, and for each production incoming message of the plurality of production incoming messages, store associated timing data; store a plurality of production outgoing messages sent by the software application to a second plurality of external software components, and for each production outgoing message of the plurality of production outgoing messages, store associated timing data; store a sequence of random number values received by the software application from a random number generator, and for each random number value store associated timing data; and store a plurality of production event registrations by the software application, and for each production event registration of the plurality of production event registrations, store associated dispatch timing data, the dispatch timing data based on an actual dispatch time from a system clock for a production event associated with the production event registration. The computer program product includes instructions operable to cause the computing system during a test execution of the modified software application to: connect, to the modified software application, via a communication channel; send, to the modified software application, via the communication channel, one or more production incoming messages of the plurality of production incoming messages and the associated timing data, wherein for each production incoming message of the one or more production incoming messages the sending is based on at least one of a request received from the software application and the associated timing data of the production incoming message, the production incoming message causing the software application to adjust an internal time based on the associated timing data of the production incoming message; receive, from the modified software application, via the communication channel, one or more test outgoing messages and validate the one or more test outgoing messages based on the plurality of production outgoing messages; send, to the software application, via the communication channel, one or more random number values of the sequence of random number values, wherein for each random number value of the one or more random number values the sending is based on the associated timing data for the random number value; receive, from the software application, via the communication channel, one or more test event registrations and validate the one or more test event registrations based on the plurality of production event registrations; and send, to the software application, via the communication channel, a dispatch message to dispatch an event associated with a test event registration of the one or more test event registrations, the dispatch message causing the software application to dispatch the event based on the associated dispatch timing data of a production event registration corresponding to the test event registration.

In some embodiments, at least one external software component is in the first plurality of external software components and the second plurality of external software components. In some embodiments, at least one external software component of the first plurality of external software components executes on the computer system. In some embodiments, at least one external software component of the first plurality of external software components executes on a second computer system different than the computer system. In some embodiments, the first plurality of external software components include one or more of applications, streaming data sources, and signal sources. In some embodiments, the plurality of production incoming messages include one or more of data values, streaming data, or notifications. In some embodiments, the computer program product further includes instructions operable to cause the computing system to determine the modified software application failed the testing if validation of the one or more test outgoing messages or validation of the one or more test event registrations fails.

In another aspect, there is a method performed by a computer system for testing a modified version of a software application. The method includes, during a production execution of the software application, storing a plurality of production incoming messages received by the software application from a first plurality of external software components, and for each production incoming message of the plurality of production incoming messages, storing associated timing data; storing a plurality of production outgoing messages sent by the software application to a second plurality of external software components, and for each production outgoing message of the plurality of production outgoing messages, storing associated timing data; storing a sequence of random number values received by the software application from the random number generator, and for each random number value storing associated timing data; and storing a plurality of production event registrations by the software application, and for each production event registration of the plurality of production event registrations, storing associated dispatch timing data, the dispatch timing data based on an actual dispatch time from the system clock for a production event associated with the production event registration. The method includes during a test execution of the modified software application, connecting to the modified software application, via a communication channel; sending, to the modified software application, via the communication channel, one or more production incoming messages of the plurality of production incoming messages and the associated timing data, wherein for each production incoming message of the one or more production incoming messages the sending is based on at least one of a request received from the software application and the associated timing data of the production incoming message, the production incoming message causing the software application to adjust an internal time based on the associated timing data of the production incoming message; receiving, from the modified software application, via the communication channel, one or more test outgoing messages and validating the one or more test outgoing messages based on the plurality of production outgoing messages; sending, to the software application, via the communication channel, one or more random number values of the sequence of random number values, wherein for each random number value of the one or more random number values the sending is based on the associated timing data for the random number value; receiving, from the software application, via the communication channel, one or more test event registrations and validating the one or more test event registrations based on the plurality of production event registrations; and sending, to the software application, via the communication channel, a dispatch message to dispatch an event associated with a test event registration of the one or more test event registrations, the dispatch message causing the software application to dispatch the event based on the associated dispatch timing data of a production event registration corresponding to the test event registration.

In some embodiments, at least one external software component is in the first plurality of external software components and the second plurality of external software components. In some embodiments, at least one external software component of the first plurality of external software components executes on the computer system. In some embodiments, at least one external software component of the first plurality of external software components executes on a second computer system different than the computer system. In some embodiments, the first plurality of external software components include one or more of applications, streaming data sources, and signal sources. In some embodiments, the plurality of production incoming messages include one or more of data values, streaming data, or notifications. In some embodiments, the method can include determining the modified software application failed the testing if validation of the one or more test outgoing messages or validation of the one or more test event registrations fails.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Computing Environment

Figure 1:
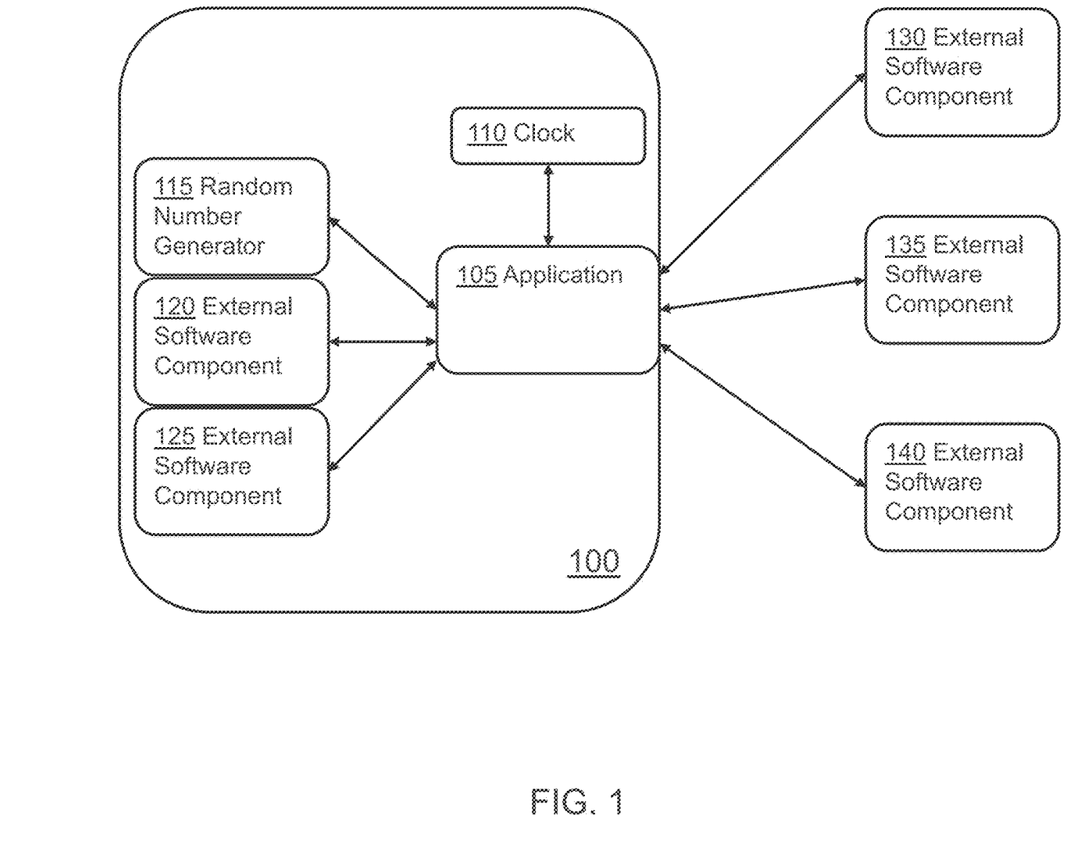
FIG. 1 illustrates a computer system on which an application executes.

FIG. 1 illustrates computer system 100 on which application 105 executes. Computer system 105 is a computing device including specialized hardware and/or software modules that execute on a processor and interact with memory modules of computer system 105 to execute application 105 and support regression testing of application 105 as described further herein. Computer system 100 includes clock 110, random number generator 115, external software component 120, and external software component 125. Also illustrated are external software component 130, external software component 135, and external software component 140.

Application 105 can be an application under development, such as an application that is modified to add features or functionality, running on computer system 100. Clock 110 can be a system clock that provides the current time. Random number generator can be, for example, a software-based pseudo-random number generator or a hardware-based random number generator with a software interface. External software component 120 and external software component 125 can be software components running on computer system 100 that are external to application 105 (e.g., software components that are not controlled application 105). External software component 130, external software component 135, and external software component 140 can be software components running on a computing device other than computer system 100.

Application 105 can communicate with clock 110, random number generator 115, external software component 120, and external software component 125 via hardware and/or software data sharing or messaging facilities provided by computer system 100. For example, Application 105 can communicate with clock 110, random number generator 115, external software component 120, and external software component 125 using application system calls, shared memory, sockets, virtual networks, etc. Application 105 can communicate with external software component 130, external software component 135, and external software component 140 via, e.g., a local network, such as a LAN, or a wide area network, such as the Internet and/or a cellular network.

It should be appreciated that FIG. 1 depicts an exemplary configuration of computer system 100. In accordance with the technology, any number of external software components (e.g., running on the computer system or another computing device) can be used.

Application 105 can execute on computer system 100. During execution, application 105 can receive signals from clock 110 that provide the current time. Application 105 can request and/or receive random numbers from random number generator 115. Application 105 can send to and/or receive messages from external software component 120, external software component 125, external software component 130, external software component 135, and external software component 140. As an illustrative example, application 105 can be a security order routing application. External software component 120 can be an order input application, and external software component 125 can be a database. External software component 130 can be a trading system for a first securities exchange, external software component 135 can be a trading system for a second securities exchange, and external software component 140 can be a market data system. During operation, application 105 can receive orders from external software component 120 (e.g., the order input application). Based, in part on the current market data received from software component 140 (e.g., the market data system), application 105 can determine which orders to send to external software component 130 (e.g., the trading system for the first securities exchange) and external software component 135 (e.g., the trading system for the second securities exchange). Application 105 can store the placed orders on external software component 125 (e.g., the database).

Regression Testing

Regression testing can include two phases: 1) running test cases on the application before modification (e.g., the production version of the application) to determine its expected performance; and 2) running the same test cases on the application after modification (e.g., the test version of the application) to test for regression by the modified application.

Production Test Case Execution

Figure 2:
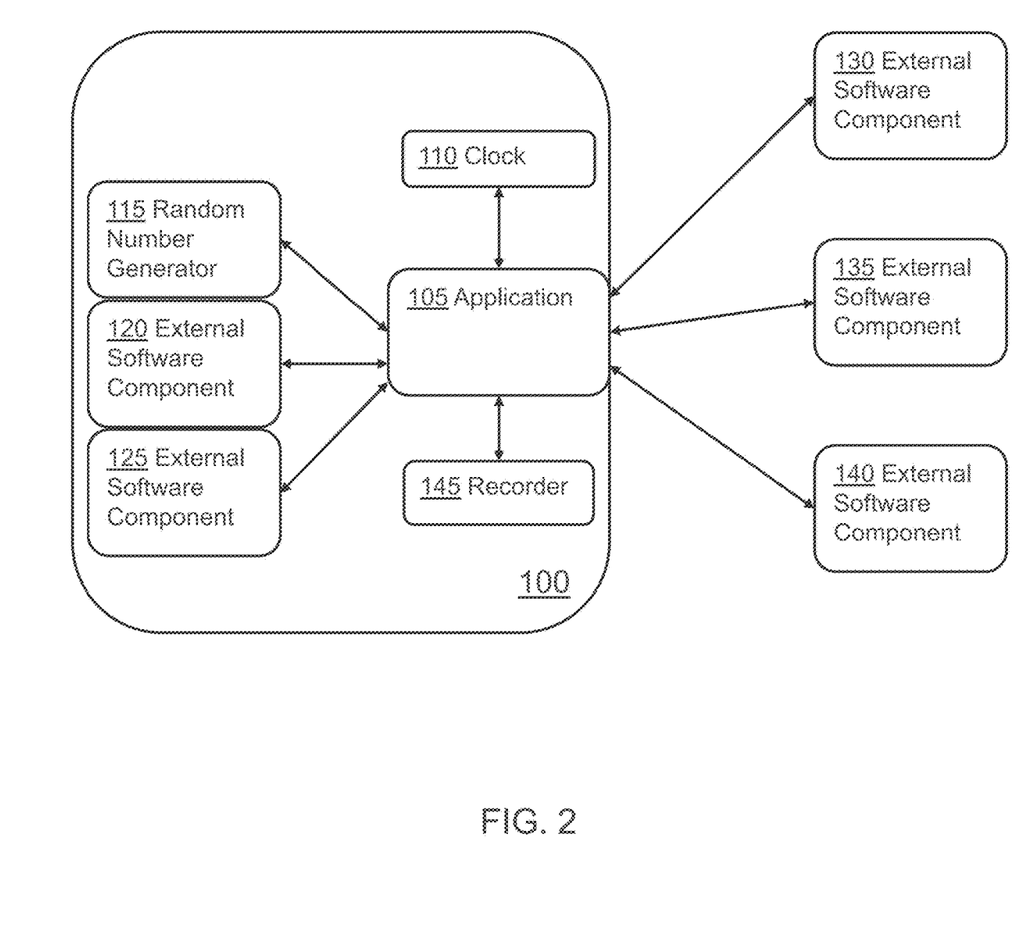
FIG. 2 illustrates the computer system for running test cases on the production version of the application.

FIG. 2 illustrates computer system 100 for running test cases on the production version of application 105. In accordance with the technology, recorder module 145 can store information as the test cases executes on the production version of application 105. In some embodiments, application 105 can be instrumented to provide to recorder 145 the information relevant to the current test case. For example, application 105 can provide recorder 145 production incoming messages received by application 105 from one or more of external software components 120, 125, 130, 135, and 140. For each production incoming message, the recorder can capture the source of the message, associated timing data for the message, and the content of the message. The source of the message can refer to the external software component that sent the message, such as external software component 120, 125, 130, 135, or 140. The associated timing data for the message can be a relative time indicator or the time application 105 received the message as provided by clock 110. The content of the message can be the data provided by the external software component to application 105 that application 105 uses during its execution.

Application 105 can provide recorder 145 production outgoing messages sent by application 105 to one or more of external software components 120, 125, 130, 135, and 140. For each production outgoing message, the recorder can capture the destination of the message, associated timing data for the message, and the content of the message. The destination of the message can refer to the external software component to which application 105 sent the message, such as external software component 120, 125, 130, 135, or 140. The associated timing data for the message can be a relative time indicator or the time application 105 sent the message as provided by clock 110. The content of the message can be the data provided by application 105 to the external software component.

Application 105 can provide recorder 145 the sequence of random number values received by application 105 from random number generator 115. Application 105 can provide recorder 145 event registrations by application 105. For each event registration, recorder 145 can capture the event registration and associated dispatch timing data. The event registration data can include the type of event, such as a timer. The dispatch timing data can include the actual dispatch time, based on the clock 110, when the event is actually dispatched by computer system 100. Beneficially, by capturing both the event registration data and the actual dispatch time of the event, the technology can account for differences between the intended time for dispatching the event and the actual time the event is dispatched. For example, the dispatch of the event can be delayed due to internal task scheduling on computer system 100.

Generating Testing Script

Figure 3:
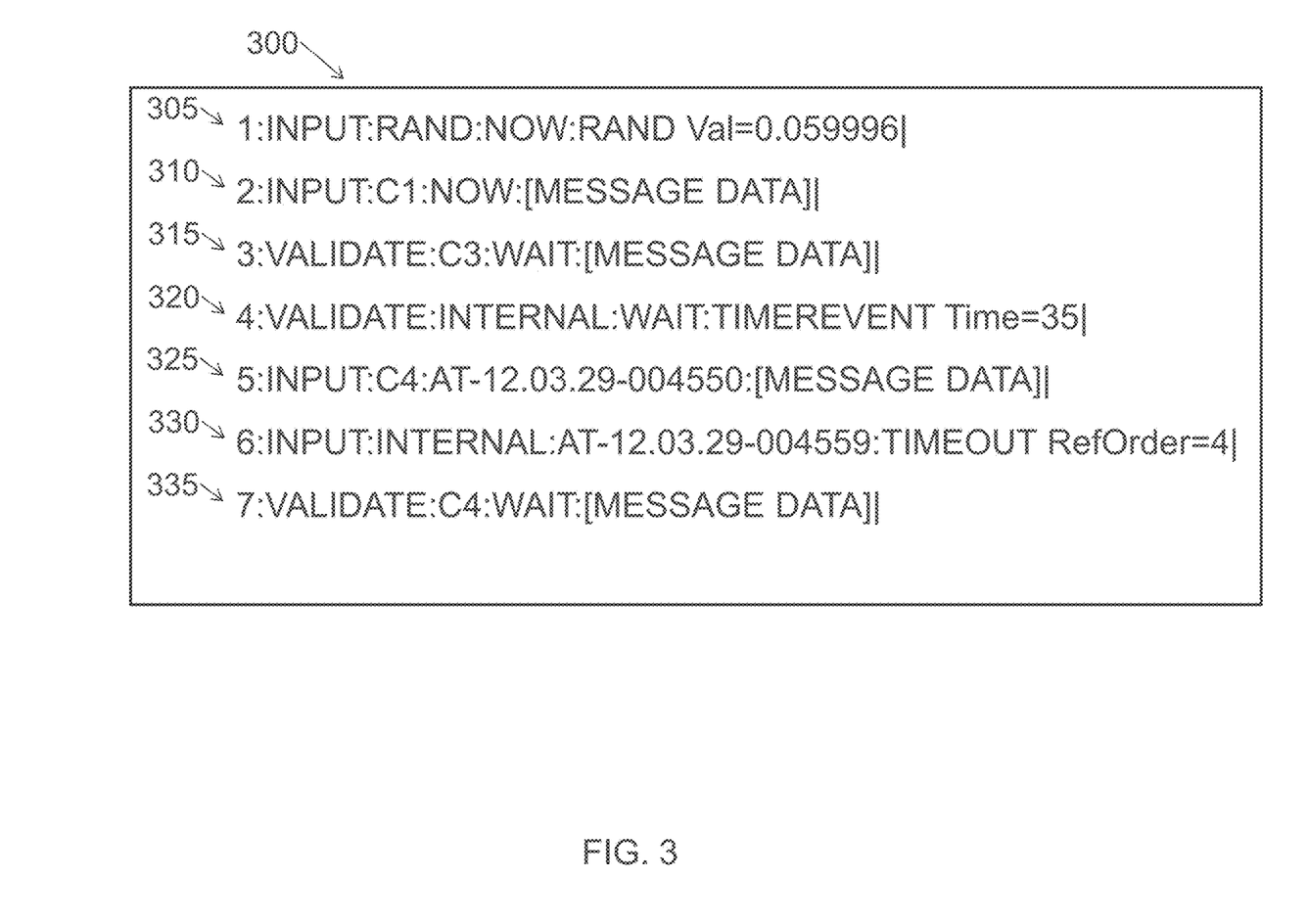
FIG. 3 illustrates an example of a test script generated by the technology.

Following the production execution of a test case, the technology can generate a test script based on the information stored during the production test case execution. In accordance with embodiments of the technology, a test script can include an ordered sequence of steps generated by the technology based on the information captured during the production test case run. FIG. 3 illustrates an example of test script 300 generated by the technology including steps 305, 310, 315, 320, 325, 330, and 335. The syntax for steps 305, 310, 315, 320, 325, 330, and 335 is the following:

STEP NO.:INPUT or VALIDATE:COMPONENT:TIME: MESSAGE DATA STEP NO. can be the step's number in the ordered sequence of steps of the test script. The sequencing can preserve the order in which events happened during the production test case execution. INPUT or VALIDATE can indicate whether the step requires the technology to provide information to application 105 during execution of the step or receive information from application 105 during execution of the step. COMPONENT can indicate the component that sent the information to application 105 or the component to which the data was sent by application 105. TIME can indicate the timing data for the step. The uses of each of these fields are further explained by way of the following examples.

For a production incoming message received by software 105, the technology can generate an INPUT step. The step can include the STEP NO. value to indicate the sequencing of the step relative to other events from the production test case run. The step can include a COMPONENT value indicating which component the production incoming message came from (e.g., external software component 120, 125, 130, 135, or 140, etc.). The step can include a TIME value to indicate the timing of the step. MESSAGE DATA can be the message data sent by the external software component.

Step 305 of FIG. 3 illustrates a test script step generated by the technology based on a random number value application 105 received from random number generator 115. As illustrated, step 305 has a SEQUENCE NO. value of "1" and is an INPUT step. Step 305 indicates the random number value came from "RAND," or random number generator 115. The TIME value for step 305 is "NOW," indicating the random number value can be provided to application 105 during the regression test case execution without altering the internal clock of application 105. Step 305 includes the MESSAGE DATE value "RAND Val=0.059996" indicating the random number value.

Step 310 illustrates a test script step generated by the technology based on a production incoming message. As illustrated, step 310 has a SEQUENCE NO. value of "2" and is an INPUT step. Step 310 indicates the production incoming message came from the external software component "C1." The TIME value for step 310 is "NOW." indicating the MESSAGE DATA can be provided to application 105 during the regression test case execution without altering the internal clock of application 105. Step 310 includes the MESSAGE DATE value "[MESSAGE DATA]" for illustrative purposes as a substitute for the actual message data.

Step 315 illustrates a test script step generated by the technology based on a production outgoing message. As illustrated, step 315 has a SEQUENCE NO. value of "3" and is a VALIDATE step. Step 310 indicates application 105 sent the production outgoing message to the external software component "C3." The TIME value for step 310 is "WAIT." indicating the player module (discussed below) should wait until it receives a message from application 105 when executing step 315. Step 315 includes the MESSAGE DATE value "[MESSAGE DATA]" for illustrative purposes as a substitute for the actual message data.

Steps 320 and 330 illustrate test script steps generated by the technology based on a production event registration. Step 320 has a SEQUENCE NO. value of "4" and is a VALIDATE step. Step 320 indicates the source of the production event registration was "INTERNAL," or application 105. The TIME value for step 320 is "WAIT." indicating the player module should wait until it receives a message from application 105 when executing step 320. Step 320 includes the MESSAGE DATE value "TIMER-EVENT Time=35," indicating the production event registration is for a 35 ms timer. Step 330 has a SEQUENCE NO. value of "6" and is an INPUT step. The TIME value for step 330 is "AT-12.03.29-004559," indicating the actual time the production event registration in step 320 was dispatched during the production test case execution (e.g., the actual time the 35 ms timer elapsed). Step 330 includes the MESSAGE DATE value "TIM EOUT RefOrder=4" indicating the event is the time out of the timer from Step No.

4 (e.g., step 320). It should be appreciated that the steps 325 appears between steps 320 and 325 in the test script because during the production test case run, an event occurred between the timer being started and the timer elapsing.

Step 325 illustrates a test script step generated by the technology based on a production incoming message. As illustrated, step 325 has a STEP NO. value of "5" and is an INPUT step. Step 325 indicates the production incoming message came from the external software component "C4." The TIME value for step 325 is "AT-12.03.29-004559," indicating that when the MESSAGE DATA is provided to application 105 during the regression test case execution, the internal clock of application 105 will be set to 12.03.29-004559. Step 325 includes the MESSAGE DATE value "[MESSAGE DATA]" for illustrative purposes as a substitute for the actual message data.

Step 335 is a test script step generated by the technology based on a production outgoing message. As illustrated, step 335 has a SEQUENCE NO. value of "7" and is a VALIDATE step. Step 335 indicates application 105 sent the production outgoing message to the external software component "C4." The TIME value for step 335 is "WAIT," indicating the player module should wait until it receives a message from application 105 when executing step 335. Step 335 includes the MESSAGE DATE value "[MESSAGE DATA]" for illustrative purposes as a substitute for the actual message data.

Regression Test Case Execution

Figure 4:
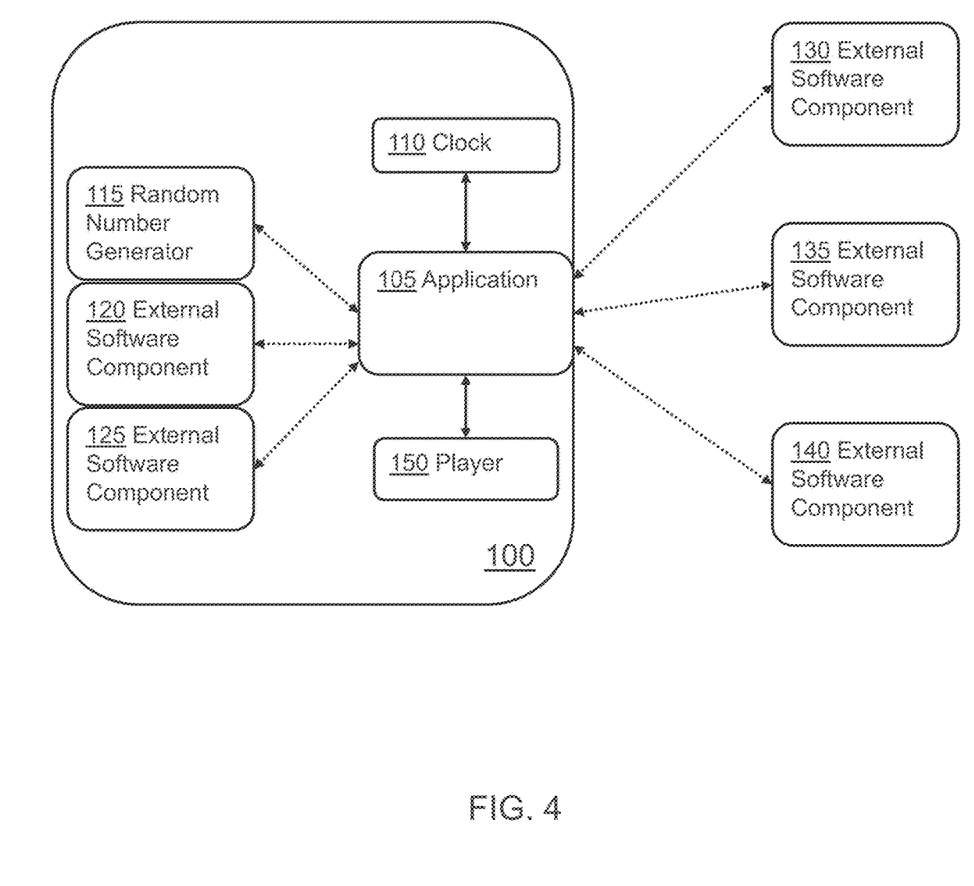
FIG. 4 illustrates the computer system for running test case scripts on the modified version of the application.

FIG. 4 illustrates computer system 100 for running test case scripts on the modified version of application 105. In accordance with the technology, player module 150 controls execution of the modified version of application 105 during execution of regression test cases. In some embodiments, application 105 can be instrumented to connect to player module 150 via a socket for test regression case execution. When executing regression test cases, application 105 does not interact with random number generator 115 and external software component 120, 125, 130, 135, and 140. Instead, player module 150 emulates all of the components in a single thread. Beneficially, this can ensure that application 105 operates on the same input data, in the same sequence, as application 105 during the production test case execution. Player module 150 can send to application 105 production incoming messages captured during the production test case execution, along with the associated timing data of each message. In some embodiments, player module 150 sends each production incoming message based on, for example, a request received from application 105 or the associated timing data of the production incoming message. In some embodiments, application 105 can be instrumented to adjust its internal time (e.g., by overriding the signal from clock 110) based on the associated timing data of the production incoming message. For example, if application 105 received a production incoming message at a certain time of day, on a certain day during the production test case execution, player module 150 can provide that time to application 105 with the production incoming message. Application 105 can temporarily set its internal current time to the time provided by player module 150 while processing the production incoming message. Beneficially, this facilitates reproducing the environment of the production test case execution and allows application 105 to process the message correctly if the processing is dependent on the time and/or date a message is received.

Player module 150 can receive from application 105 test outgoing messages. Test outgoing messages are the outgoing messages generated by application 105 during the regression test case execution. Player 150 can validate the test outgoing messages based on the plurality of production outgoing messages. For example player 150 can compare a test outgoing message to its corresponding production outgoing message. If the messages are the same, then the performance of application 105 during the test run is consistent with the production run. If the messages are not the same, then the performance of application 105 during the regression test case execution is not consistent with the production test case execution, indicating application 105 has regressed after modification. Player module 150 can send to application 105 the random number values of the sequence captured during the production test case execution based on the associated timing data for the random number value. Player module 150 can receive from application 105 test event registrations and validate the one or more test event registrations based on the plurality of production event registrations.

Player module 150 can send to application 105 a dispatch message to dispatch an event associated with a test event registration of the one or more test event registrations, the dispatch message can cause the software application to dispatch the event based on the associated dispatch timing data of the production event registration corresponding to the test event registration.

Figure 5:
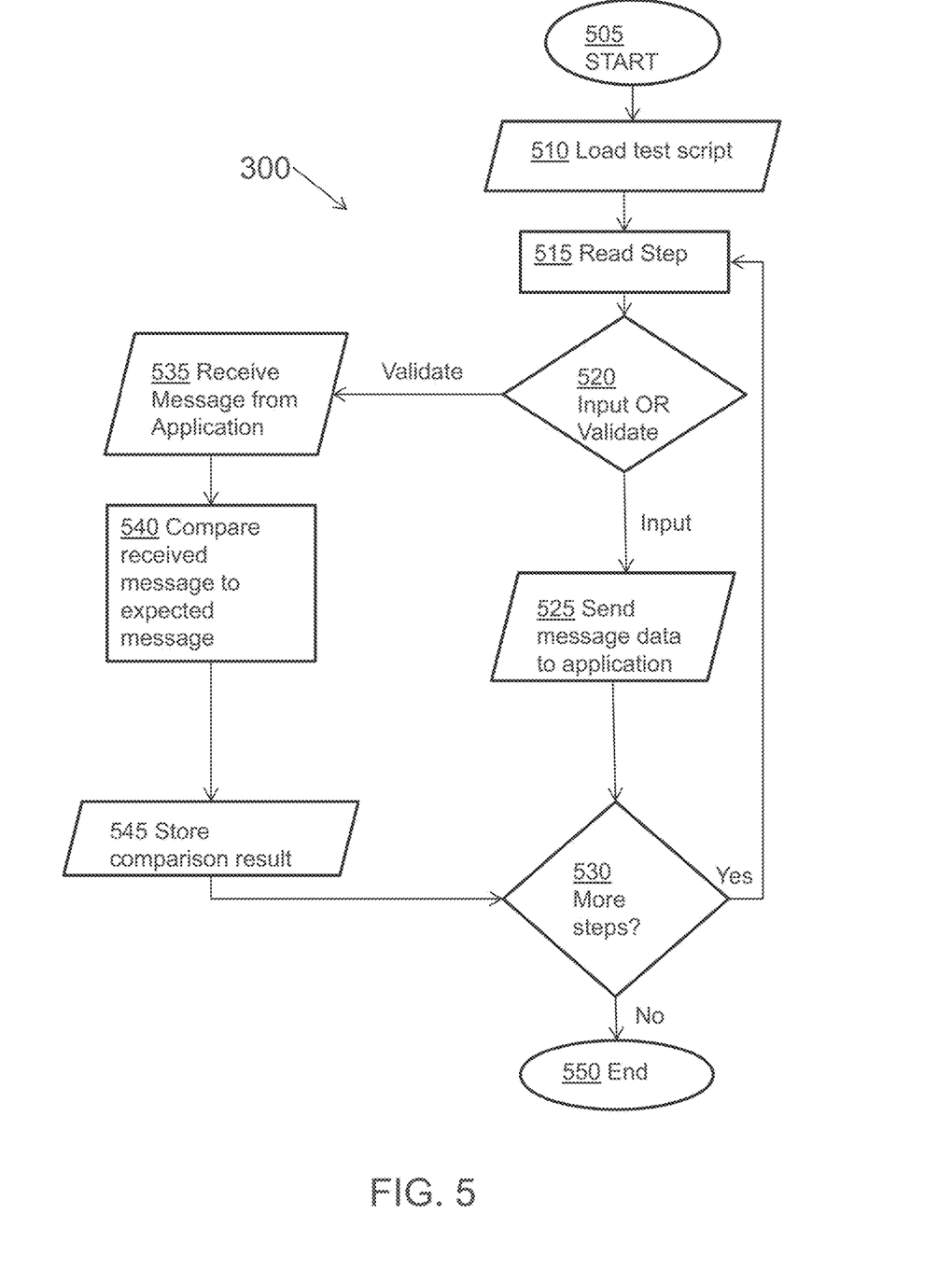
FIG. 5 is a flow chart illustrating an execution of test case by the player module based on a test case script.

In accordance with the technology, player module 150 can use a test script, as described above, to execute a regression test case. FIG. 5 is a flow chart illustrating execution of a test case by player module 150 based on a test case script. As an illustrative example, the steps of flow chart 500 will be illustrated with reference to example test script 300 of FIG. 3. At block 505, player module 150 starts the regression test execution. At block 510, player module 150 loads test script 300. At step block 515, player module 150 reads the first step (step 305) in test script 300. "1:INPUT:RAND:NOW: RAND Val=0.0599961." At block 520, player module 150 determines the step is an INPUT step, and proceeds to block 525. At block 525, player module 150 sends the MESSAGE DATA value ("RAND Val=0.0599961") and the TIME value ("NOW") to application 105. In response to receiving the MESSAGE DATA value and the TIME value, application 105 continues executing using the random number value. At block 530, player module 150 determines there are more steps in test script 300 and proceeds to block 515.

At block 515, player module 150 reads the second step (step 310) in test script 300, "2:INPUT:C1:NOW:[MESSAGE DATA]|." At block 520, player module 150 determines the step is an INPUT step, and proceeds to block 525. At block 525, player module 150 sends the MESSAGE DATA value and the TIME value ("NOW") to application 105. In response to receiving the MESSAGE DATA value and the TIME value, application 105 processed the message and continues executing. At block 530, player module 150 determines there are more steps in test script 300 and proceeds to block 515.

At block 515, player module 150 reads the third step (step 315) in test script 300, "3:VALIDATE:C3:WAIT:[MESSAGE DATA]|." At block 520, player module 150 determines the step is a VALIDATE step, and proceeds to block 535. At block 535, player module 150 waits until application 105 sends a test outgoing message to player module 150, as required by the TIME value ("WAIT"). After receiving a test outgoing message, at block 540, player module 150 validates the test outgoing message by comparing it to the COMPONENT value and MESSAGE DATA value from the third step in test script 300. For example, player module 150 can determine whether the destination of the test outgoing message matches the COMPONENT value from the third step in test script 300 and the content of the test outgoing message matches the MESSAGE DATA value from the third step in test script 300. At block 545, player module 150 stores whether the values matched. If the values match, player module 150 continues to block 530. In some embodiments, if the values do not match, player module 150 can end the regression test case execution because the behavior of application 105 has changed, and application 105 has failed the regression test. In some embodiments, application 105 can continue to block 530 when the values did not match. At block 530, player module 150 determines there are more steps in test script 300 and proceeds to block 515.

At block 515, player module 150 reads the fourth step (step 320) in test script 300, "4:VALIDATE:INTERNAL:WAIT:TIMEREVENT Time=35|." At block 520, player module 150 determines the step is a VALIDATE step, and proceeds to block 535. At block 535, player module 150 waits until application 105 sends a test event registration to player module 150, as required by the TIME value ("WAIT"). After receiving a test event registration, at block 540, player module 150 validates the test event registration by comparing it to the COMPONENT value and MESSAGE DATA value from the fourth step in test script 300. If the values match, player module 150 continues to block 530. In some embodiments, if the values do not match, player module 150 can end the regression test case run because the behavior of application 105 has changed, and application 105 has failed the regression test. In some embodiments, application 105 can continue to block 530 when the values did not match. At block 530, player module 150 determines there are more step in test script 300 and proceeds to block 515.

At block 515, player module 150 reads the fifth step (step 325) in test script 300, "5:INPUT:C4:AT-12.03.29-004550:[MESSAGE DATA]|." At block 520, player module 150 determines the step is an INPUT step, and proceeds to block 525. At block 525, player module 150 sends the MESSAGE DATA value and the TIME value ("AT-12.03.29-004550") to application 105. In response to receiving the MESSAGE DATA value and the TIME value, application 105 sets its internal clock to "2.03.29-004550" and processes the MESSAGE DATA value. At block 530, player module 150 determines there are more steps in test script 300 and proceeds to block 515.

At block 515, player module 150 reads the sixth step (step 330) in test script 300, "6:INPUT:INTERNAL:AT-12.03.29-004559:TIMEOUT RefOrder=4|." At block 520, player module 150 determines the step is an INPUT step, and proceeds to block 525. At block 525, player module 150 sends the MESSAGE DATA value and the TIME value ("AT-12.03.29-004559") to application 105. In response to receiving the MESSAGE DATA value and the TIME value, application 105 sets it internal clock to "2.03.29-004550" and processes the elapsing of the of the 35 ms timer previously registered. At block 530, player module 150 determines there are more steps in test script 300 and proceeds to block 515.

At block 515, player module 150 reads the seventh step (step 335) in test script 300, "7:VALIDATE:C4:WAIT:[MESSAGE DATA]|." At block 520, player module 150 determines the step is a VALIDATE step, and proceeds to block 535. At block 535, player module 150 waits until application 105 sends a test outgoing message to player module 150, as required by the TIME value ("WAIT"). After receiving a test outgoing message, at block 540, player module 150 validates the test outgoing message by comparing it to the COMPONENT value and MESSAGE DATA value from the seventh step in test script 300. If the values match, player module 150 continues to block 530. In some embodiments, if the values do not match, player module 150 can end the regression test case run because the behavior of application 105 has changed, and application 105 has failed the regression test. In some embodiments, application 105 can continue to block 530 when the values did not match. At block 530, player module 150 determines there are no more steps in test script 300 and proceeds to block 550. At step 550, player module 150 ends the regression test case execution.

The above-described techniques can be implemented in specialized digital and/or analog electronic circuitry, or in specialized computer hardware, firmware, and software. The implementation can be as a computer program product, i.e., a computer program tangibly embodied in a machine-readable storage device, for execution by, or to control the operation of, a specialized data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more specialized processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special-purpose processors and/or microprocessors specifically programmed with specialized instructions executable to perform the methods described herein. Generally, a processor receives instructions and data from a read-only memory or a random access memory or both. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks.

The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer system for testing a modified version of a software application, the computer system comprising:
   a. a random number generator;
   b. a system clock;
   c. a recorder module, during a production execution of the software application, the recorder module configured to:
      i. store a plurality of production incoming messages received by the software application from a first plurality of external software components, and for each production incoming message of the plurality of production incoming messages, store associated timing data;
      ii. store a plurality of production outgoing messages sent by the software application to a second plurality of external software components, and for each production outgoing message of the plurality of production outgoing messages, store associated timing data;
      iii. store a sequence of random number values received by the software application from the random number generator, and for each random number value store associated timing data;
      iv. store a plurality of production event registrations by the software application, and for each production event registration of the plurality of production event registrations, store associated dispatch timing data, the dispatch timing data based on an actual dispatch time from the system clock for a production event associated with the production event registration;
   d. a playback module, during a test execution of the modified software application, the playback module configured to:
      i. connect, to the modified software application, via a communication channel;
      ii. send, to the modified software application, via the communication channel, one or more production incoming messages of the plurality of production incoming messages and the associated timing data, wherein for each production incoming message of the one or more production incoming messages the sending is based on at least one of a request received from the software application and the associated timing data of the production incoming message, the production incoming message causing the software application to adjust an internal time based on the associated timing data of the production incoming message, and wherein the test is executed using the one or more production incoming messages;

iii. send, to the software application, via the communication channel, one or more random number values of the sequence of random number values, wherein for each random number value of the one or more random number values the sending is based on the associated timing data for the random number value, and wherein the test is executed using the one or more random number values of the sequence of random number values;

iv. receive, from the modified software application, via the communication channel, one or more test outgoing messages and validate the one or more test outgoing messages based on the plurality of production outgoing messages, wherein the one or more test outgoing messages are generated by the modified software application during the test execution;

v. receive, from the software application, via the communication channel, one or more test event registrations and validate the one or more test event registrations based on the plurality of production event registrations; and vi. send, to the software application, via the communication channel, a dispatch message to dispatch an event associated with a test event registration of the one or more test event registrations, the dispatch message causing the software application to dispatch the event based on the associated dispatch timing data of a production event registration corresponding to the test event registration.

2. The computer system of claim 1, wherein at least one external software component is in the first plurality of external software components and the second plurality of external software components.

3. The computer system of claim 1, wherein at least one external software component of the first plurality of external software components executes on the computer system.

4. The computer system of claim 1, wherein at least one external software component of the first plurality of external software components executes on a second computer system different than the computer system.

5. The computer system of claim 1, wherein the first plurality of external software components comprise one or more of applications, streaming data sources, and signal sources.

6. The computer system of claim 1, wherein the plurality of production incoming messages comprise one or more of data values, streaming data, or notifications.

7. The computer system of claim 1, wherein the playback module is further configured to:

a. determine the modified software application failed the testing if validation of the one or more test outgoing messages or validation of the one or more test event registrations fails.

8. A non-transitory computer readable storage device containing a computer program product for testing a modified version of a software application, the computer program product including instruction operable to cause a computing system to:

a. during a production execution of the software application:

i. store a plurality of production incoming messages received by the software application from a first plurality of external software components, and for each production incoming message of the plurality of production incoming messages, store associated timing data;

ii. store a plurality of production outgoing messages sent by the software application to a second plurality of external software components, and for each production outgoing message of the plurality of production outgoing messages, store associated timing data;

iii. store a sequence of random number values received by the software application from a random number generator, and for each random number value store associated timing data;

iv. store a plurality of production event registrations by the software application, and for each production event registration of the plurality of production event registrations, store associated dispatch timing data, the dispatch timing data based on an actual dispatch time from a system clock for a production event associated with the production event registration;

b. during a test execution of the modified software application:

i. connect, to the modified software application, via a communication channel;

ii. send, to the modified software application, via the communication channel, one or more production incoming messages of the plurality of production incoming messages and the associated timing data, wherein for each production incoming message of the one or more production incoming messages the sending is based on at least one of a request received from the software application and the associated timing data of the production incoming message, the production incoming message causing the software application to adjust an internal time based on the associated timing data of the production incoming message, and wherein the test is executed using the one or more production incoming messages;

iii. send, to the software application, via the communication channel, one or more random number values of the sequence of random number values, wherein for each random number value of the one or more random number values the sending is based on the associated timing data for the random number value, and wherein the test is executed using the one or more random number values of the sequence of random number values;

iv. receive, from the modified software application, via the communication channel, one or more test outgoing messages and validate the one or more test outgoing messages based on the plurality of production outgoing messages, wherein the one or more test outgoing messages are generated by the modified software application during the test execution;

v. receive, from the software application, via the communication channel, one or more test event registrations and validate the one or more test event registrations based on the plurality of production event registrations; and vi. send, to the software application, via the communication channel, a dispatch message to dispatch an event associated with a test event registration of the one or more test event registrations, the dispatch message causing the software application to dispatch the event based on the associated dispatch timing data of a production event registration corresponding to the test event registration.

9. The computer program product of claim 8, wherein at least one external software component is in the first plurality of external software components and the second plurality of external software components.

10. The computer program product of claim 8, wherein at least one external software component of the first plurality of external software components executes on the computer system.

11. The computer program product of claim 8, wherein at least one external software component of the first plurality of external software components executes on a second computer system different than the computer system.

12. The computer program product of claim 8, wherein the first plurality of external software components comprise one or more of applications, streaming data sources, and signal sources.

13. The computer program product of claim 8, wherein the plurality of production incoming messages comprise one or more of data values, streaming data, or notifications.

14. The computer program product of claim 8 further including instructions operable to cause the computing system to:
   a. determine the modified software application failed the testing if validation of the one or more test outgoing messages or validation of the one or more test event registrations fails.

15. A method performed by a computer system for testing a modified version of a software application, the method comprising:
   a. during a production execution of the software application:
      i. storing a plurality of production incoming messages received by the software application from a first plurality of external software components, and for each production incoming message of the plurality of production incoming messages, storing associated timing data;
      ii. storing a plurality of production outgoing messages sent by the software application to a second plurality of external software components, and for each production outgoing message of the plurality of production outgoing messages, storing associated timing data;
      iii. storing a sequence of random number values received by the software application from a random number generator, and for each random number value storing associated timing data;
      iv. storing a plurality of production event registrations by the software application, and for each production event registration of the plurality of production event registrations, storing associated dispatch timing data, the dispatch timing data based on an actual dispatch time from a system clock for a production event associated with the production event registration;
   b. during a test execution of the modified software application:
      i. connecting, to the modified software application, via a communication channel;
      ii. sending, to the modified software application, via the communication channel, one or more production incoming messages of the plurality of production incoming messages and the associated timing data, wherein for each production incoming message of the one or more production incoming messages the sending is based on at least one of a request received from the software application and the associated timing data of the production incoming message, the production incoming message causing the software application to adjust an internal time based on the associated timing data of the production incoming message, and wherein the test is executed using the one or more production incoming messages;
      iii. sending, to the software application, via the communication channel, one or more random number values of the sequence of random number values, wherein for each random number value of the one or more random number values the sending is based on the associated timing data for the random number value, and wherein the test is executed using the one or more random number values of the sequence of random number values;
      iv. receiving, from the modified software application, via the communication channel, one or more test outgoing messages and validating the one or more test outgoing messages based on the plurality of production outgoing messages, wherein the one or more test outgoing messages are generated by the modified software application during the test execution;
      v. receiving, from the software application, via the communication channel, one or more test event registrations and validating the one or more test event registrations based on the plurality of production event registrations; and
      vi. sending, to the software application, via the communication channel, a dispatch message to dispatch an event associated with a test event registration of the one or more test event registrations, the dispatch message causing the software application to dispatch the event based on the associated dispatch timing data of a production event registration corresponding to the test event registration.

16. The method of claim 15, wherein at least one external software component is in the first plurality of external software components and the second plurality of external software components.

17. The method of claim 15, wherein at least one external software component of the first plurality of external software components executes on the computer system.

18. The method of claim 15, wherein at least one external software component of the first plurality of external software components executes on a second computer system different than the computer system.

19. The method of claim 15, wherein the first plurality of external software components comprise one or more of applications, streaming data sources, and signal sources.

20. The method of claim 15, wherein the plurality of production incoming messages comprise one or more of data values, streaming data, or notifications.

21. The method of claim 15, further comprising:
   a. determining the modified software application failed the testing if validation of the one or more test outgoing messages or validation of the one or more test event registrations fails.

* * * * *